(12) United States Patent
Ju

(10) Patent No.: US 7,313,281 B2
(45) Date of Patent: Dec. 25, 2007

(54) METHOD AND RELATED APPARATUS FOR JPEG DECODING

(75) Inventor: Chi-Cheng Ju, Hsin-Chu (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 707 days.

(21) Appl. No.: 10/711,234

(22) Filed: Sep. 3, 2004

(65) Prior Publication Data

US 2005/0047667 A1 Mar. 3, 2005

(30) Foreign Application Priority Data

Sep. 3, 2003 (TW) .............................. 92124394 A

(51) Int. Cl.
*G06K 9/36* (2006.01)
*G06K 9/46* (2006.01)

(52) U.S. Cl. ..................................................... 382/233

(58) Field of Classification Search ................ 382/233, 382/235, 240, 248, 251, 299; 375/240.25
See application file for complete search history.

(56) References Cited

U.S. PATENT DOCUMENTS 6,259,820 B1* 7/2001 Stone .......................... 382/250
7,254,272 B2* 8/2007 Mitchell et al. ............. 382/233

* cited by examiner

*Primary Examiner*—Phuoc Tran
(74) *Attorney, Agent, or Firm*—Winston Hsu

(57) ABSTRACT

A progressive decoding method for decoding a bit-stream signal into corresponding image data is disclosed. The bit-stream signal includes a plurality of scans. The progressive decoding method includes receiving the plurality of scans according to a predetermined sequence, decoding each of the scans into a partial decoded pixel and a non-zero indicator, and summing each newly generated partial decoded pixel and updating a non-zero history with the non-zero indicator according to the predetermined sequence.

20 Claims, 7 Drawing Sheets

METHOD AND RELATED APPARATUS FOR JPEG DECODING

BACKGROUND

The present invention discloses a progressive decoding method and an apparatus thereof. In particular, the present invention discloses a method and a related apparatus capable of decoding each scan so as to generate a partial decoded pixel and a corresponding non-zero indicator, and summing up the partial decoded pixels generated each time and updating a non-zero history with the non-zero indicator, thereby reducing the demand of memory capacity.

The Joint Photographic Expert Group (JPEG) standard can efficiently compress digital gray scale or color images, and four different operation modes are included in the specification, which use different encoding and decoding algorithm respectively: Sequential Discrete Cosine Transform (DCT) based, Progressive DCT based, Lossless, and Hierarchy mode. The JPEG format is frequently used in the Internet to compress still image. Since the image data encoded in the JPEG format are of a certain size, the image can not be completely displayed until all the data are completely received in the Internet environment. When the available bandwidth is limited, it may take much time to display the whole image, and results in Internet resource waste. Thus, among the four different operation modes of JPEG, the progressive DCT based technology becomes the most popular jPEG decoding technology because it can display a rough image first and refine the image over time. Therefore, users can view the image being received roughly before the whole image is completely received.

For the progressive DCT based encoding procedure, a sample block consists of 8×8 samples. When an image is being encoded, the sample blocks are typically input from the left to the right, and block-row by block-row from the top to the bottom. Please refer to FIG. 1. FIG. 1 is a diagram of a related art progressive JPEG encoder 10, and it illustrates a related art progressive JPEG encoding procedure. The JPEG encoder 10 shown in FIG. 1 comprises a forward DCT transformer 12, a quantizer 14, a first memory buffer 16, and a variable length encoder 18. After a sample block is transformed into 64 digital DCT coefficients by a forward DCT transformation operation by the forward DCT transformer 12, and then quantized by the quantizer 14, and prepared for entropy encoding, all 64 of its quantized DCT coefficients can be immediately entropy encoded by the variable length encoder 18, and output as part of the compressed JPEG bit-stream signal. In the progressive DCT based encode procedure; the whole image is encoded by multiple scanning the image, and the compressed JPEG bit-stream signal comprises a plurality of scans. To accomplish multiple scanning, the first memory buffer 16 with storage volume approximating to the size of a single image is intervened between the quantizer 14 and the variable length encoder 18. As each sample block is transformed by the forward DCT transformer 12 and then quantized by the quantizer 14, its DCT quantized coefficients are stored in the first memory buffer 16. When all the sample blocks have finished the DCT transformation and are quantized, the quantized DCT coefficients in the first memory buffer 16 are scanned for multiple times, and the variable length encoder 18 encodes the partial quantized DCT coefficients in each of the multiple scans. Therefore, the data in a scan are formed. As mentioned above, the advantages of the progressive DCT based technology are that the scans in JPEG bit-stream signal received first are decoded first and a rough image could be displayed. The more scans received, the finer the image is. The JPEG bit-stream signal begins to be decoded even before the whole bit-stream signal is completely received.

There are two methods of multiple scanning: the spectral selection and the successive approximation. The spectral selection involves transmitting the data of part of the frequency bands in each sample block. Since most of the data of general images lie in lower frequency bands, the data of lower frequency bands can be firstly transmitted followed by the data of higher frequency bands. The successive approximation involves transmitting the most significant bit (MSB) first followed by the least significant bit while transmitting some part of bits of the digital DCT coefficients. Please refer to FIG. 2. FIG. 2 is a diagram illustrating a related art spectral selection method. In the (progressive DCT based) JPEG standard, an image can be separated into a plurality of sample blocks, each of which is the size of 8×8. In FIG. 2, the cube 20 on the top is the set of the whole sample blocks of an image. The smaller cubes (sub-cubes) lining up from the right to the left (sub-cube 0 to 7) represent a quantized DCT coefficient, where each sub-cube represents one bit. That is to say, sub-cubes 0 to 7 distinctly correspond to bits 0 to 7 wherein the left most bit is the MSB and the right most bit is the LSB. The 64 quantized DCT coefficients in a vertical plane are the coefficients of one sample block and each horizontal line is defined as the zeroth to the 63rd quantized DCT coefficients from top to bottom. The total number of bits is 64×8. In FIG. 2, the zeroth quantized DCT coefficient is transmitted and defined as scan(0) when it is scanned the first time; the first and the second quantized DCT coefficients are transmitted and defined as scan(1) when it is scanned the second time; and the third, fourth and fifth quantized DCT coefficients are transmitted and defined as scan(2) when it is scanned the third time. The whole image data are transmitted as the rule described above. Since each quantized DCT coefficient in the sample block corresponds to different frequencies, different quantized DCT coefficients in the sample block are transmitted in each of multiple scans to accomplish spectral selection.

Please refer to FIG. 3. FIG. 3 is a diagram illustrating a related art successive approximation procedure. The cube 30 is the set of the whole sample block of the image. The zeroth quantized DCT coefficient of each sample block is transmitted and defined as scan (0) when it is scanned the first time; the bits 7 to 4 of the quantized DCT coefficients of the sample block are transmitted and defined as scan (1) when it is scanned the second time; and the bit 3 of the quantized DCT coefficients of the sample block are transmitted and defined as scan (2). Transmitting different bits when scanning at different times can accomplish the successive approximation. All the rules described above can be adjusted to achieve different progressive image effects.

The decoding process is the inverse process of encoding. Please refer to FIG. 4. FIG. 4 is a block diagram of part of the components in a progressive JPEG decoder 40, and it also illustrates a related art progressive JPEG decoding procedure. FIG. 4 shows a variable length encoder 42(VLD), an inverse quantizer 44, a second memory buffer 46, and an inverse DCT transformer 48. Generally speaking, the encoded JPEG bit-stream signal (transmitted from the JPEG encoder 10 in FIG. 1) is decoded by the variable length decoder 42. In the related art progressive JPEG decoder 40, there is a second memory buffer 46 with storage volume approximating to the size of the image where the quantized DCT coefficients can be stored after the process of the variable length decoder 42. When all the quantized DCT coefficients (after the process of the variable length decoder 42) in one scan of the JPEG bit-stream signal are collected, the progressive image is rebuilt with the decoded pixels generated after the inverse quantized operation of the inverse quantizer 44 and the inverse DCT (IDCT) operation of the inverse DCT transformer 48. However the size of the images may be very large, for example, in the JPEG CCITT T.81 specification the image size could be as large as 65535×65535 pixels. Since the related art progressive JPEG decoder 40 could not incorporate a second memory buffer 46 with giga-byte size capacity, the images may not be able to be decoded successfully. Furthermore, the information application (IA) products are very popular now and equipped with much smaller memory size than traditional desktop personal computer. Hence, it becomes more and more important to develop a new progressive JPEG decoding algorithm and the apparatus thereof to reduce the capacity requirement of the second memory buffer 46 in FIG. 4.

SUMMARY

It is one of the objectives of the present invention to provide a progressive decoding method capable of saving memory resources to solve the above-mentioned problem.

In the present invention, the data in each scan are decoded so as to generate a partial decoded pixel and a corresponding non-zero indicator on the basis of the present progressive JPEG standard and the structure of a corresponding decoder. All the partial decoded pixels are accumulatively summed up and a non-zero history is updated with the non-zero indicator when a scan is decoded. When all the scans have been decoded, the outputted decoded pixels are the complete image data. Therefore, the progressive JPEG decoder of the present invention does not need an image-sized memory buffer for progressive JPEG decoding. Hence, the present invention can substantially reduce the requirement of large system memory size.

According to one embodiment of the present invention, a progressive decoding method for decoding a bit-stream signal into an image data is disclosed. The bit-stream signal comprises a plurality of scans. The progressive decoding method comprises receiving the plurality of scans in a predetermined sequence, decoding the scan into a partial decoded pixel and a non-zero indicator in each scan, and summing up the partial decoded pixel generated from each of the scans and updating a non-zero history with the non-zero indicator generated from each of the scans according to the predetermined sequence.

According to the embodiment of the present invention, a progressive decoding method for decoding a bit-stream having a plurality of scans into an image data is disclosed. The progressive decoding method comprises: (a) receiving a scan; (b) determining whether the scan is the first one among the scans; if it is, progressing to step (c); if it is not, progressing to step (d); (c) decoding the scan into a partial decoded pixel and a non-zero history; (d) decoding the scan into a partial decoded pixel and a non-zero indicator; and after step (d), (e) summing up the partial decoded pixel and a previously generated partial decoded pixel, and updating the non-zero history with the non-zero indicator.

According to the embodiment of the present invention, a progressive decoding method for decoding a bit-stream signal into an image data is disclosed. The bit-stream signal comprises a plurality of scans. The progressive decoding method comprises: (a) receiving a scan; (b) determining whether the scan is the first one among the scans; if it is, progressing to step (c); if it is not, progressing to step (e); (c) decoding the scan into a partial decoded pixel and a non-zero history; (d) after step (c), down-sampling the partial pixel for generating a partial down-sampled decoded pixel; (e) decoding the scan into a partial decoded pixel and a non-zero indicator; (f) after step (e), down-sampling the partial decoded pixel for generating a partial down-sampled decoded pixel; and after step (f), (g) summing up the partial decoded pixel and a previously generated partial down-sampled decoded pixel, and updating the non-zero history with the non-zero indicator.

According to the embodiment of the present invention, a progressive decoder for decoding a bit-stream signal into an image data is disclosed. The bit-stream signal comprises a plurality of scans. The progressive decoder comprises: a processing unit for receiving the scans in a predetermined sequence, decoding each of the scans into a partial decoded pixel and a non-zero indicator according to the predetermined sequence, summing partial decoded pixels generated from the scans according to the predetermined sequence, updating a non-zero history with the non-zero indicator, and outputting the image data; a storage device for storing a accumulatively summed partial decoded pixel and the updated non-zero history; and a memory management unit electrically coupled to the storage device and the processing unit for controlling the storage device.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 2:
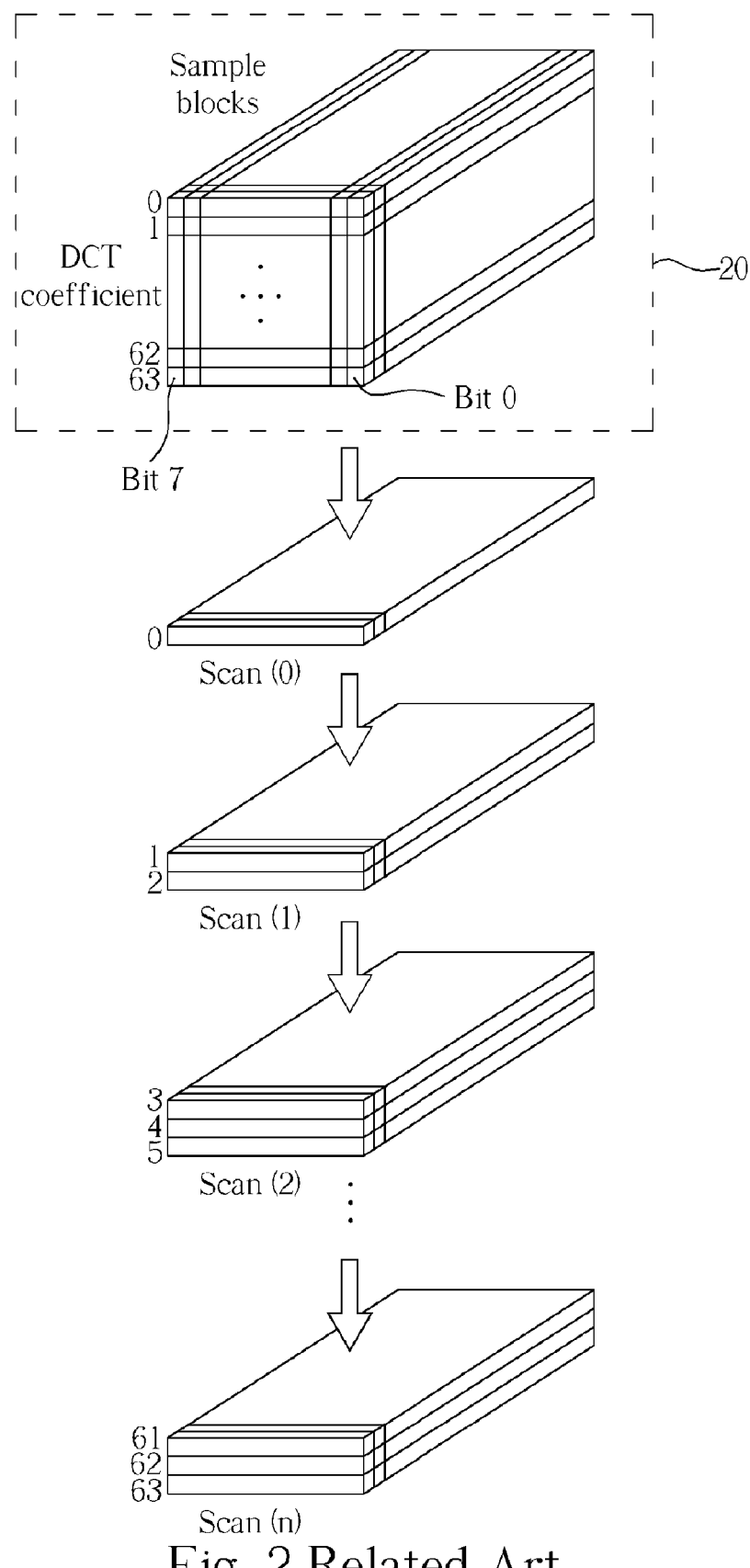
FIG. 2 is a diagram illustrating a related art spectral selection.
Figure 3:
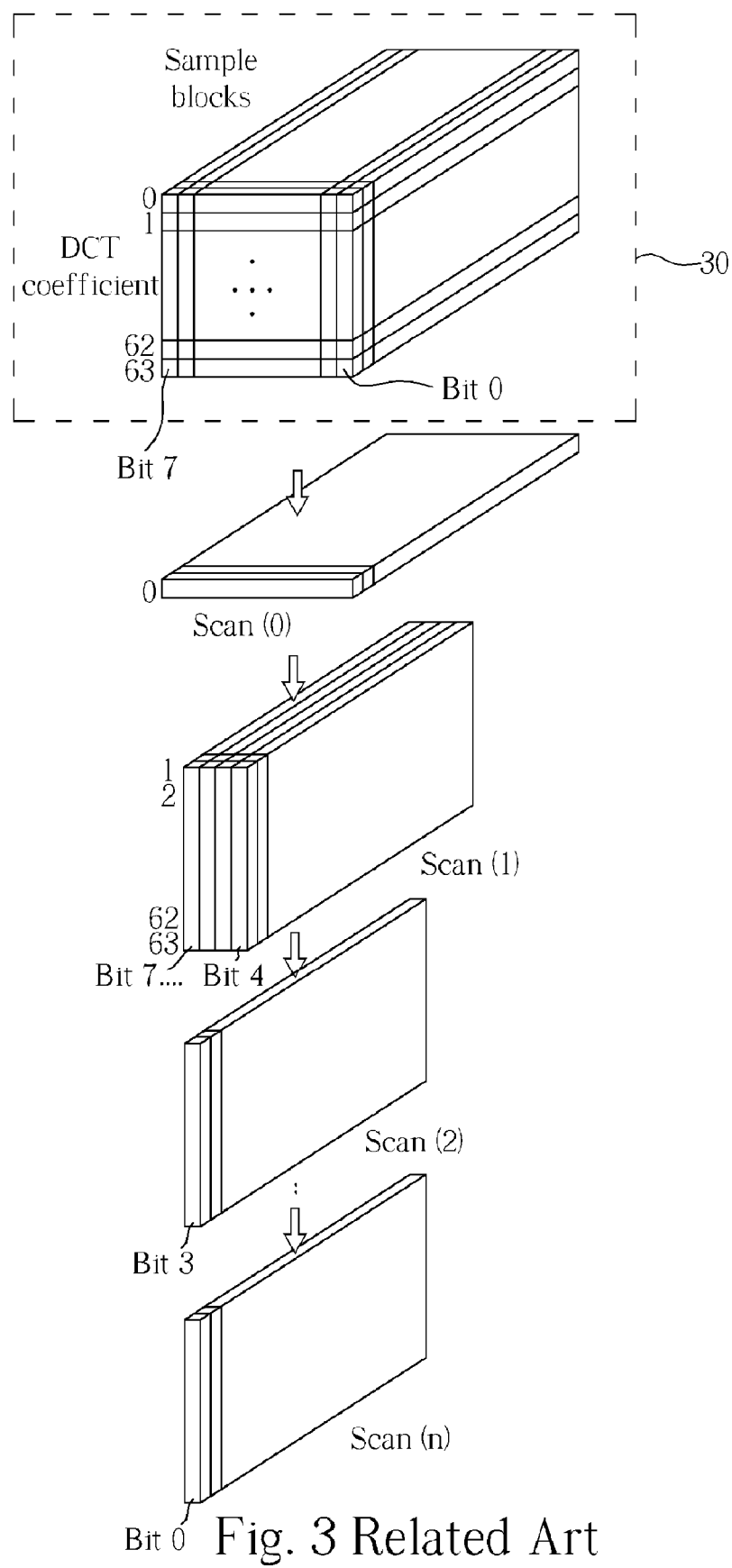
FIG. 3 is a diagram illustrating a related art successive approximation procedure.
Figure 5:
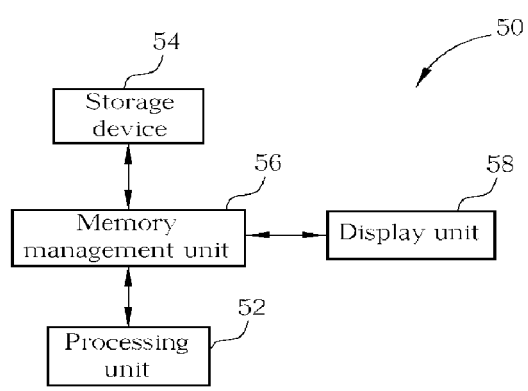
FIG. 5 is a block diagram of a progressive decoder according to an embodiment of the present invention.

The present invention provides a new progressive JPEG decoding method used for decoding a progressive JPEG bit-stream signal into image data even when the corresponding memory resources are limited. Referring back to FIG. 2 and FIG. 3, when set 20 or 30 containing all the sample blocks of a single image is divided in to a plurality of scans (from scan (0) to scan (n)), in a broad sense, the plurality of scans can still be thought of as the above-mentioned bit-stream signal, no matter successive approximation or spectral selection or both are adopted in the encoding process. Besides, a progressive decoder is provided in the embodiment. Please refer to FIG. 5. FIG. 5 is a block diagram of a progressive decoder 50 according to an embodiment of the present invention. The progressive decoder 50 comprises a processing unit 52, a storage device 54, and a memory management unit 56. The processing unit 52 can be realized by a digital signal processor (DSP), which receives the plurality of the scans (such as scan (0) to scan (n) in FIGS. 2 and 3) in sequence, and performs the progressive decoding method of present invention. The processing unit 52 can decode each scan received into a partial decoded pixel and a non-zero indicator (the non-zero indicator represents whether or not an encoding coefficient of the current decoded scan corresponds to a non-zero value, and quantized DCT coefficient is as an example of the encoding coefficient), sum up the partial decoded pixels generated from each scan in sequence, update a non-zero history with the non-zero indicator, and output the image data. For example, for updating the non-zero history each time the non-zero indicator of the newly decoded scan is generated, an "OR" operation could be performed on the previously stored non-zero history and the non-zero indicator to get the new version non-zero history. The memory management unit 56 electrically coupled to the processing unit 52 and the storage device 54 can store the summed up partial decoded pixels and the updated non-zero history in sequence after the process of the processing unit 52.

The progressive JPEG decoding process of present invention, which is used in the processing unit 52 can be better illustrated with the example of an 8×8 inverse discrete cosine transform (IDCT). More specifically, after the decoded DCT coefficients are generated by the variable length decoder 42 and the inverse quantizer 44 of FIG. 4, the 8×8 IDCT could be used to inverse transform the decoded DCT coefficients. The 8×8 IDCT can be described below:

$$y_{h,v} = \sum_{k=0}^{7}\sum_{l=0}^{7} c(k)c(l)*x_{k,l}* \cos\left(\frac{(2h+1)}{16}k\pi\right)*\cos\left(\frac{(2v+1)}{16}l\pi\right) \quad \text{Equation (1)}$$

wherein $y_{h,v}$ is the decoded pixel, $x_{k,l}$ is the decoded DCT coefficient, $$c(0) = \frac{1}{2\sqrt{2}}, \quad c(i) = \frac{1}{2},$$

and i is a natural number, where i=1-7.

Assume the m-th scan includes only part of the quantized DCT coefficients, and even some bits of the coefficients. One feature of the present invention is to directly inverse quantize the received quantized DCT coefficients of the m-th scan and derive the m-th partial decoded DCT coefficient $x_{k,l}^m$. The inverse quantization operation involves multiplying the quantized DCT coefficients with a quantization value to derive the DCT coefficients. Hence, the inverse quantization operation itself is a linear operation and the relationship between the integral decoded DCT coefficient and the partial decoded DCT coefficient of a certain scan, say the m-th scan, can be expressed as:

$$x_{k,l} = \sum_{m=0}^{n-1} x_{k,l}^m \quad \text{Equation (2)}$$

wherein m and n are integers, $x_{k,l}^m$ represents the partial decoded DCT coefficients of the m-th scan, and n means there are n scans in a progressive image bitstream. Combining equations (1) and (2) results in:

$$\begin{aligned}y_{h,v} &= \sum_{k=0}^{7}\sum_{l=0}^{7} c(k)c(l)*\left[\sum_{m=0}^{n-1} x_{k,l}^m\right]* \\ &\quad \cos\left(\frac{(2h+1)}{16}k\pi\right)*\cos\left(\frac{(2v+1)}{16}l\pi\right) \\ &= \sum_{m=0}^{n-1}\left\{\sum_{k=0}^{7}\sum_{l=0}^{7} c(k)c(l)*[x_{k,l}^m]* \right. \\ &\quad \left. \cos\left(\frac{(2h+1)}{16}k\pi\right)*\cos\left(\frac{(2v+1)}{16}l\pi\right)\right\} \\ &= \sum_{m=0}^{n-1} y_{h,v}^m\end{aligned} \quad \text{Equation (3)}$$

Thus the relationship between the integral decoded pixel $y_{h,v}$ and the partial decoded pixel $y_{h,v}^m$ can be presented as follows:

$$y_{h,v} = \sum_{m=0}^{n-1} y_{h,v}^m$$

wherein m and n are both integers, $y_{h,v}^m$ represents the partial decoded pixel of the m-th scan, and n means there are total n scans in a progressive image bitstream.

Therefore, the decoded pixel $y_{h,v}$ after IDCT operation can be obtained by summing up the partial decoded pixel $y_{h,v}^m$ decoded in each scan. Whenever the processing unit 52 of the present invention in FIG. 5 receives the encoding bistream data of a scan, which is generated by either successive approximation, spectral selection, or both methods, the embodiment directly performs inverse quantization operation of the quantized DCT coefficients of the received scan to derive partial decoded DCT coefficient $x_{k,l}^m$ and then generates the partial decided pixel $y_{h,v}^m$ by calculating the above equation (3).

If the storage device 54 has stored the decoded and summed partial decided pixel of all the scans previously received, for example, if the storage device 54 has stored the summed partial decoded pixel $$\left(\sum_{m=0}^{k-1} y_{h,v}^m\right)$$

from the zeroth to the (k−1)-th scan, the processing unit 52 will read the summed partial decoded pixel stored in the storage device 54 through the memory management unit 56, sum it up with the partial decoded pixel $(y_{h,v}^k)$ generated from the current decoding scan, generate the new summed partial decoded pixel $$\left(\sum_{m=0}^{k} y_{h,v}^m = \sum_{m=0}^{k-1} y_{h,v}^m + y_{h,v}^k\right),$$

store the new summed partial decoded pixel through the memory management unit 56 and replace the original summed partial decoded pixel in the storage device 54.

Besides, since the scan in the progressive JPEG bit-stream signal is dependent, that is, the decoded result of previous scans is referred to when current scan is being decoded. The decoded quantized DCT coefficients of a scan have to be stored for further reference by later scan decoding. However, it is not feasible to provide a buffer with a large enough capacity to store all the decoded quantized DCT coefficients. Hence, in order to reduce memory storage size requirement, the embodiment stores the non-zero history of already decoded quantized DCT coefficient instead of storing all the decoded DCT coefficients. As specified in the section G.1.2.3 in JPEG ITU T.81 specification, the Huffman decoding process of current scan must refer to the non-zero history of co-located decoded quantized DCT coefficients in previous scans. The non-zero history of a quantized DCT coefficient records whether the co-located quantized DCT coefficients of the previous scans are encoded as a non-zero value. The non-zero history of a quantized DCT coefficient can be recorded as one bit data. If the co-located quantized DCT coefficients of the previous scans are ever encoded as a non-zero value, the non-zero history bit of the quantized DCT coefficient is set to one; otherwise, it is set to zero. Hence, in addition to store the summed partial decoded pixel $$\sum_{m=0}^{k-1} y_{h,v}^m$$

in the storage device 54, the embodiment also stores the non-zero history of already decoded quantized DCT coefficients instead of storing all the coefficients to reduce the required memory storage size. Thus, the memory size of storage device 54 can be greatly reduced because the size for storing the non-zero history for each quantized DCT coefficient could be as small as only one bit.

Figure 1:
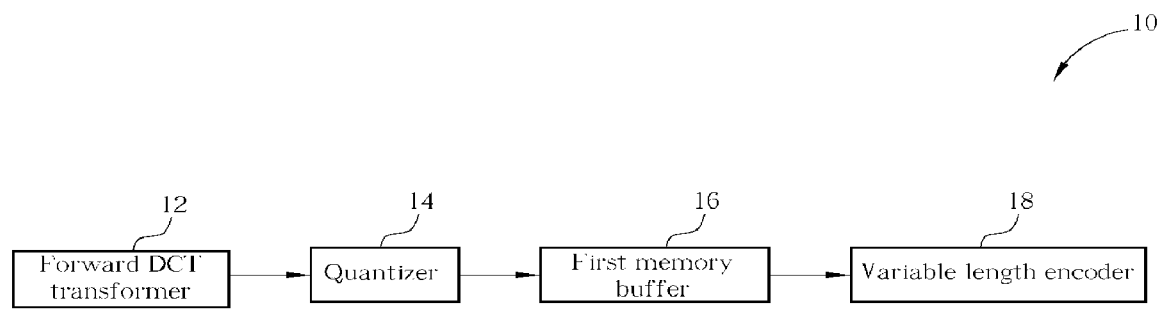
FIG. 1 is a diagram of a related art JPEG encoder.
Figure 6:
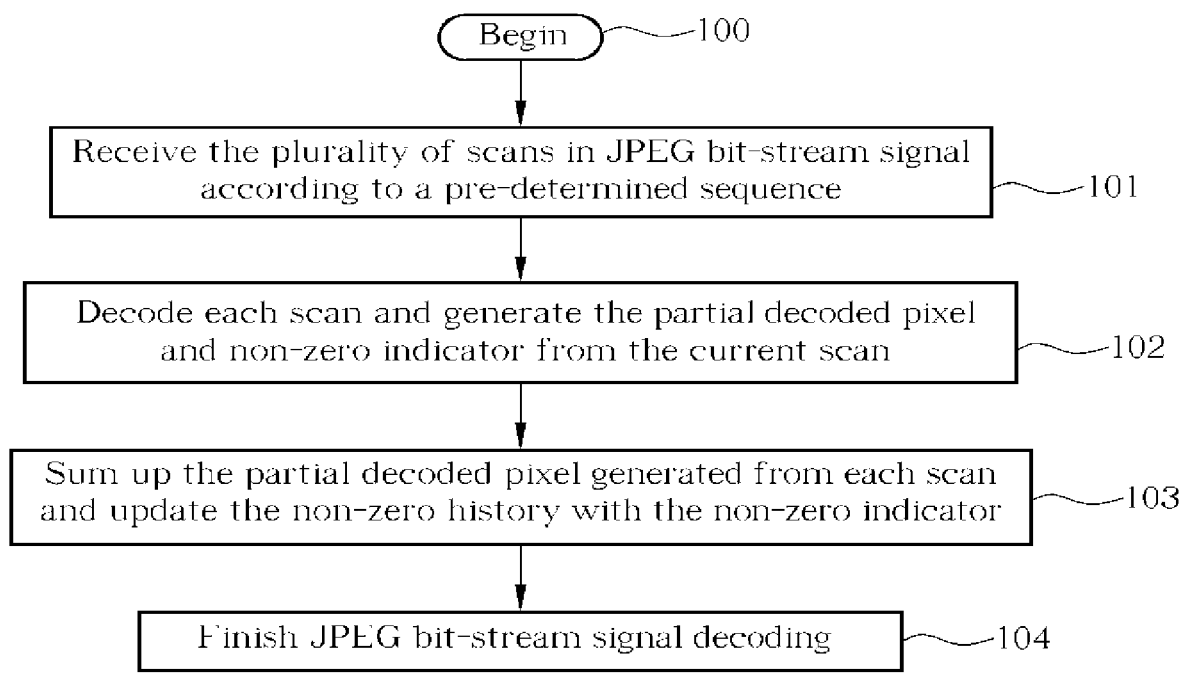
FIG. 6 is a flowchart of a method according to an embodiment of the present invention.

The progressive decoder 50 further comprises a display unit 58. The display unit 58 coupled to the memory management unit 56 is used for displaying the decoded image data. The embodiment is illustrated in FIG. 6 on the basis of the progressive decoder 50 in FIG. 5. FIG. 6 is a flowchart of a method according to an embodiment of the present invention. The flow includes following steps:

Step 100: Begin;

Step 101: The processing unit 52 in the progressive decoder 50 receives the plurality of scans of progressive JPEG bit-stream signal in a predetermined sequence, wherein each of the scans can be defined by the related art successive approximation, spectral selection, or both methods and the predetermined sequence, for example, is the transmitting sequence of the plurality of scans from progressive encoder 10 in FIG. 1 to progressive decoder 50 in FIG. 5;

Step 102: Decode each scan and generate the partial decoded pixel and non-zero indicator of the current scan (as mentioned before, the non-zero indicator represents whether or not an encoding coefficient of the current decoded scan corresponds to a non-zero value, and quantized DCT coefficient is as an example of the encoding coefficient). If the scan being processed is the first scan of the plurality of scans, then the scan is directly decoded without reading the summed partial decoded pixel and the corresponding non-zero history; otherwise, read the summed partial decoded pixel and the previously generated non-zero history of previous scans from the storage device 54 and then decode the scan according to the non-zero history of previous scans to generate the partial decoded pixel and the non-zero indicator of the current scan;

Step 103: If the scan being processed is the first scan of the plurality of scans, then the partial decoded pixel and the non-zero indicator generated from the first scan are directly stored into the storage device 54 (since this scan is the first scan, the non-zero indicator is stored as the non-zero history directly); otherwise, sum up the partial decoded pixel generated from the current scan and the previously summed partial decoded pixel and update the non-zero history with the non-zero indicator (for example, for updating the non-zero history with the newly generated non-zero indicator of the current scan, an "OR" operation could be performed on the previously stored non-zero history and the newly generated non-zero indicator to get the new version non-zero history), and store the new summed partial decoded pixel and the updated non-zero history into the storage device 54. In other words, the processing unit 52 accumulatively sums up the partial decoded pixels generated from each scan in a predetermined sequence and update the non-zero history accordingly;

Step 104: Decode all the scans in the JPEG bit-stream signal, and the final summed partial decoded pixels are the integral decoded pixels, which are the final decoded image data. The processing unit 52 outputs the decoded pixels to the display unit 58, and thus the decoded image data is displayed.

As mentioned above, without storing the decoded quantized DCT coefficients themselves, the storage device 54 in the embodiment simply stores the summed partial decoded pixels and the corresponding non-zero history. Hence, the progressive decoder 50 of the embodiment does not need a very large image-sized buffer and can still perform the progressive JPEG decoding on the image with a large size.

Figure 7:
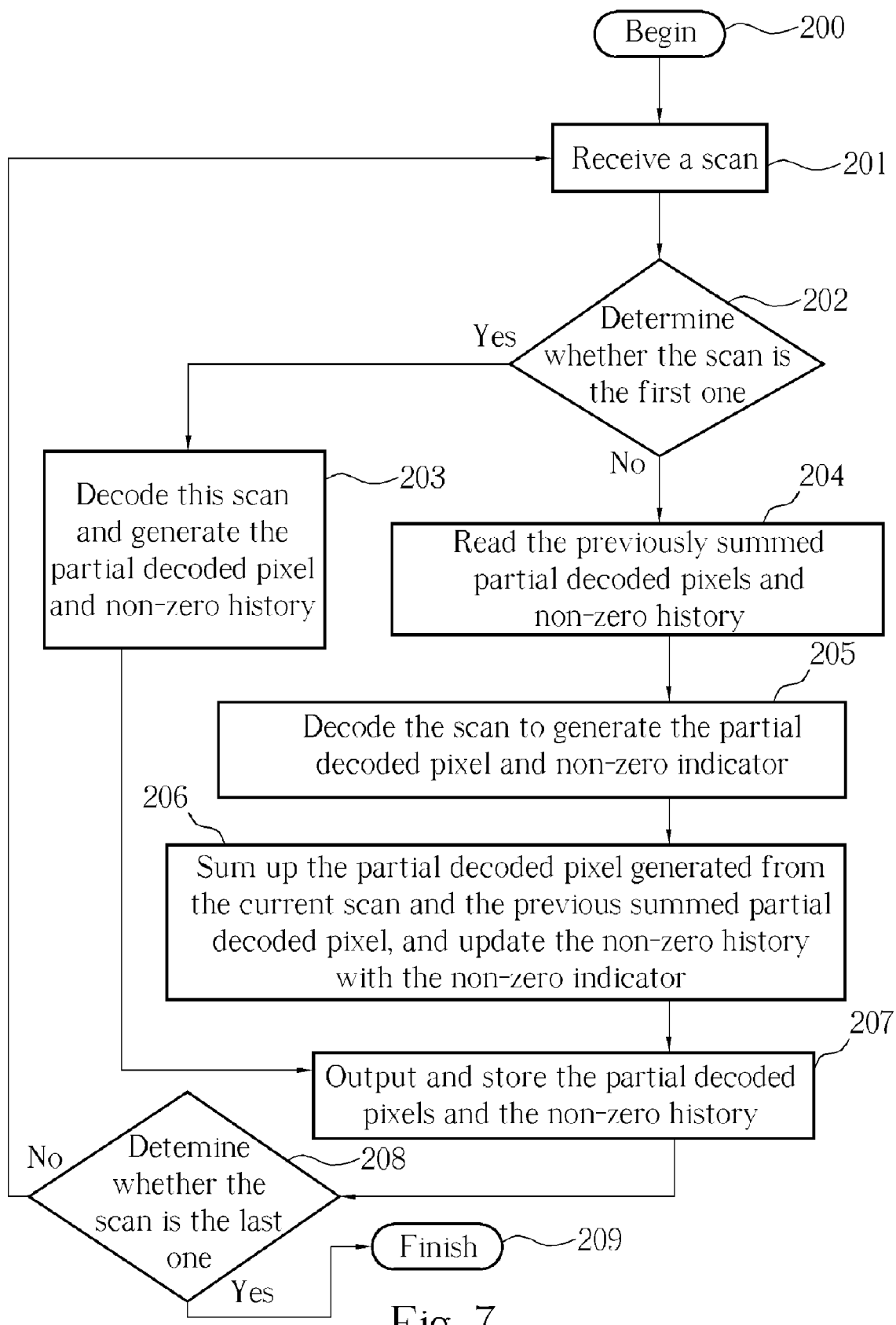
FIG. 7 is a flowchart of the method according to a detailed embodiment of the present invention.

In order to better describe the whole procedure of JPEG partial decoding, the present invention further discloses a detailed embodiment shown in FIG. 7 based on the features disclosed by the embodiment shown in FIG. 6, FIG. 7 is a flowchart of the method according to a detailed embodiment of the present invention. The flow includes following steps:

Step 200: Begin;

Step 201: Receive a scan of the JPEG bit-stream signal with the processing unit 52 in FIG. 5;

Step 202: Determine whether the current scan is the first scan of the plurality of scans of the JPEG bit-stream signal, and if it is, progress to step 203, if it is not, progress to step 204;

Step 203: Decode the scan and generate the partial decoded pixel and non-zero history of the first scan and then progress to step 207;

Step 204: The processing unit 52 reads the previously summed decoded partial decoded pixel and non-zero history generated from all the previous scans from the storage device 54 through the memory management unit 56, and then progress to step 205;

Step 205: Decode the current scan according to the previous non-zero history so as to generate the partial decoded pixel and non-zero indicator of the current scan (as mentioned before, the non-zero indicator represents whether or not an encoding coefficient of the current decoded scan corresponds to a non-zero value, and quantized DCT coefficient is as an example of the encoding coefficient), then progress to step 206;

Step 206: Sum up the partial decoded pixel generated from the current scan and the summed partial decoded pixel generated from all the previous scans and update the non-zero history with the non-zero indicator (for example, for updating the non-zero history with the newly generated non-zero indicator of the current scan, an "OR" operation could be performed on the previously stored non-zero history and the newly generated non-zero indicator to get the new version non-zero history), then progress to 207;

Step 207: If entering this step from step 203, the processing unit 52 will store the new generated partial decoded pixel and the non-zero history into the storage device 54; otherwise, (entering this step from step 206), the processing unit 52 will store the new summed partial decoded pixel and the updated non-zero history into the storage device 54; then progress to step 208 in both cases;

Step 208: Determine whether the decoded scan is the last scan of the plurality of scans, if it is, progress to step 209, if it is not, progress back to step 201, receive the next scan of the JPEG bit-stream signal with the processing unit 52;

Step 209: Finish the progressive decoding operation of the JPEG bit-stream signal, wherein the finally summed up partial decoded pixels are the integral decoded pixels, which is the complete image data.

Another detailed embodiment of the present invention involves down-sampling the partial decoded pixels to generate partial down-sampled decoded pixels. That is, every time when the partial decoded pixels of a scan are generated, down sample the generated partial decoded pixels and accumulatively summed up the partial down-sampled decoded pixels instead of partial decoded pixels themselves. The down-sampling operation of the present invention can be accomplished by a filtering process.

Please refer to FIG. 5. In order to accomplish the filtering process, the processing unit 52 is equipped with hardware circuits or software program code to perform the filtering mechanism. Hence, the progressive decoder 50 in FIG. 5 can perform the aforementioned filtering process. The filtering process can be implemented by linear filtering process. Therefore, the relationship between the integral down-sampled decoded pixel $y_{h,v}$ and the partial down-sampled decoded pixels is presented as:

$$F(y_{h,v}) = \sum_{m=1}^{n} F(y_{h,v}^m) \qquad \text{Equation (4)}$$

wherein F is the linear filtering function, $F(y_{h,v}^m)$ represents the partial down-sampled decoded pixel of the m-th scan after linear filtering process, n means there are total n scans in the progressive JPEG bitstream, and m and n are all integers.

Figure 8:
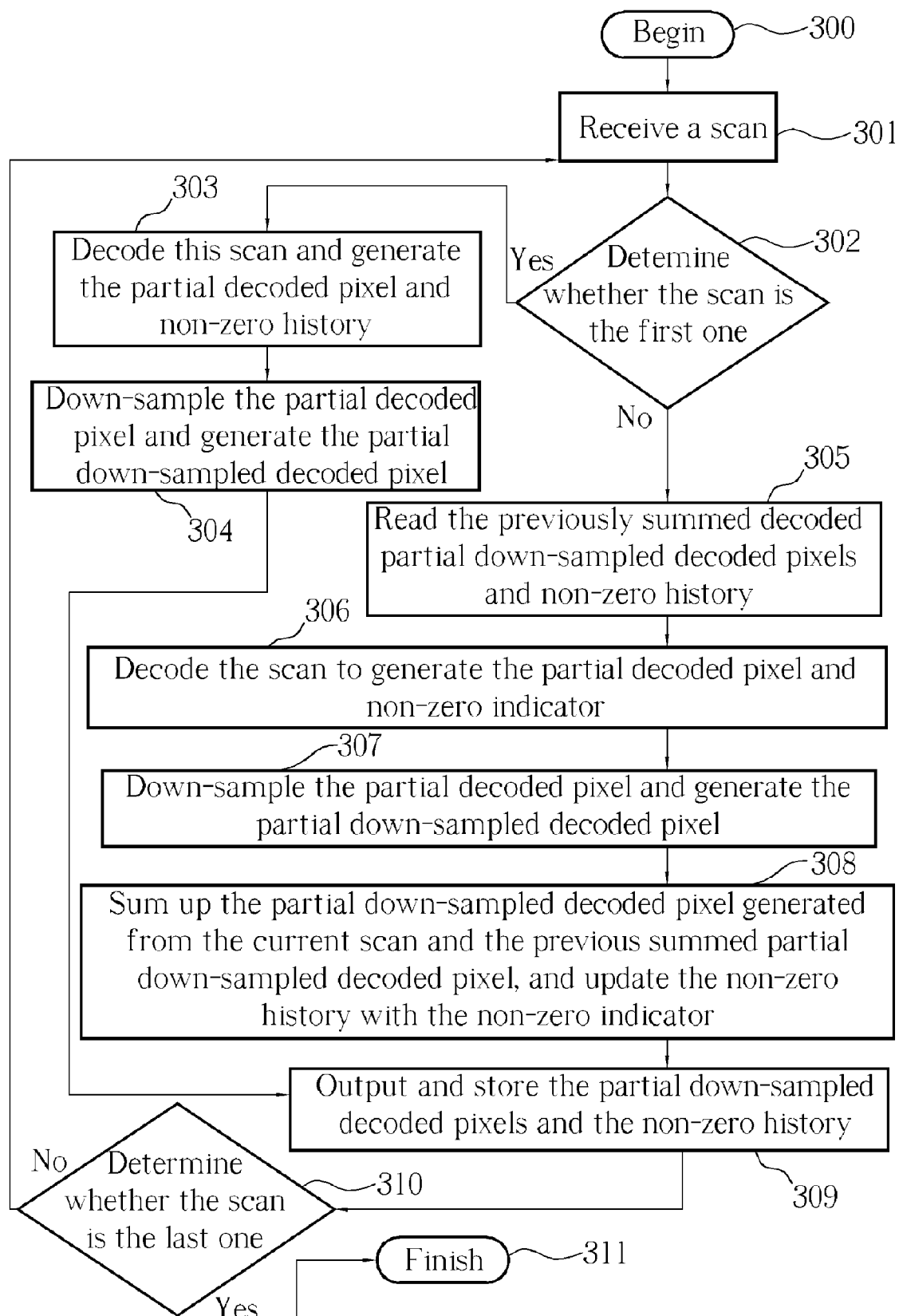
FIG. 8 is a flowchart of the method according to another detailed embodiment of the present invention.

Based on the features of down-sampling and the progressive decoder 50 shown in FIG. 5, FIG. 8 is a flowchart of the method according to another detailed embodiment of the present invention. The flow includes following steps:

Step 300: Begin;

Step 301: The processing unit 52 receives one scan of the JPEG bit-stream signal;

Step 302: Determine whether the scan is the first scan of the plurality of the scans, and if it is, progress to step 303, if it is not, progress to step 305;

Step 303: Decode the scan to generate the partial decoded pixel and the non-zero history, then progress to step 304;

Step 304: Down-sample the partial decoded pixel to generate a partial down-sampled decoded pixel, then progress to step 309;

Step 305: The processing unit 52 reads the previously summed partial down-sampled decoded pixel and the corresponding non-zero history generated from all the previous scans from the storage device 54 through the memory management unit 56 before the current scan begins to be processed, then progress to step 306;

Step 306: Decode the current scan according to the previous non-zero history to generate the partial decoded pixel and non-zero indicator from the current scan (as mentioned before, the non-zero indicator represents whether or not an encoding coefficient of the current decoded scan corresponds to a non-zero value, and quantized DCT coefficient is as an example of the encoding coefficient), then progress to step 307;

Step 307: Down-sample the partial decoded pixel and generate a partial down-sampled decoded pixel, then progress to step 308;

Step 308: Sum up the partial down-sampled decoded pixel generated from the current scan and the summed partial down-sampled decoded pixel generated from all the previous scans, and update the non-zero history with the non-zero indicator (for example, for updating the non-zero history with the newly generated non-zero indicator of the current scan, an "OR" operation could be performed on the previously stored non-zero history and the newly generated non-zero indicator to get the new version non-zero history), then progress to step 309;

Step 309: If entering this step from step 304, the processing unit 52 will store the new generated partial down-sampled decoded pixel and non-zero history into the storage device 54; otherwise, (entering this step from step 308), the processing unit 52 will store the summed up partial down-sampled decoded pixel and non-zero history into the storage device 54, then progress to step 310 in both cases;

Step 310: Determine whether the scan is the last scan of the plurality of the scan, and if it is, progress to step 311, if it is not, progress back to step 301, the processing unit 52 receives the next scan of the JPEG bit-stream signal;

Step 311: Finish the progressive decoding operation and the corresponding down-sampling operation of the JPEG bit-stream signal, wherein the finally summed partial down-sampled decoded pixels are the integral down-sampled decoded pixels, which is the complete image data.

In the embodiment in FIG. 8, the down-sampling operation will substantially reduce the computation complexity and save memory size requirement when the original image is very large. In addition, the present invention integrated with the down-sampling operation can easily accomplish the thumbnail preview function, which makes it easier to roughly and quickly display the image being received.

In steps 304 and 307, the down-sampling filtering process is operated after the partial decoded pixels are generated (the decoding process is described in the steps 303 and 306). Since the IDCT operation used in steps 303 and 306 is a linear operation, the decoding process and the filtering process can be exchanged (that is, steps 303 and 304 can be exchanged; and steps 306 and 307 can be exchanged), and thus the down-sampling filtering process can be operated before the step of IDCT operation. That is, the DCT coefficient is down-sampling filtered first, then the plurality of down-sampled DCT coefficients are inverse discrete cosine transformed correspondingly. Since the DCT coefficients are down-sampled before inverse discrete cosine transformed, the IDCT can also be simplified therefore, for example, the 8×8 IDCT can therefore become a fewer point IDCT, such as 4×4 IDCT.

Figure 4:
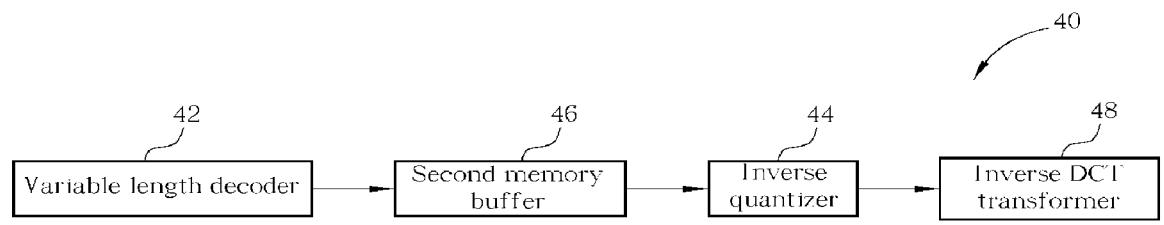
FIG. 4 is a block diagram of part of the components in a related art JPEG decoder.

Since the inverse quantization is also a linear operation in the flow path of the progressive JPEG decoding in FIG. 4, the down-sampling process can also be operated before the inverse quantization. That is, the quantized DCT coefficients are down-sampled filtered first, then the plurality of down-sampled DCT coefficients are inverse quantized and inverse discrete cosine transformed.

The present invention provides a progressive JPEG decoding method and a progressive decoder thereof, which directly decode each scan of data to generate the partial decoded pixel and the corresponding non-zero indicator, sum up accumulatively the partial decoded pixels generated from each scan, update the non-zero history with the non-zero indicator, and output the final integral decoded pixels as the complete image data after all the scans are decoded. In another embodiment of the present invention, a down-sampling operation is integrated into the characteristic of the present invention. In conclusion, the progressive JPEG decoder with the characteristics of the present invention does not need a memory buffer with the capacity of the same size as the image, and the memory size requirement for decoding a progressive JPEG bitstream can be greatly reduced.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A progressive decoding method for decoding a bit-stream signal into an image data, the bit-stream signal having a plurality of scans, the progressive decoding method comprising:
   receiving the scans according to a predetermined sequence;
   decoding each of the scans into a partial decoded pixel and a non-zero indicator, wherein the non-zero indicator represents whether or not an encoding coefficient of the current decoded scan corresponds to a non-zero value; and
   summing the partial decoded pixel generated from each of the scans according to the predetermined sequence, and updating a non-zero history with the non-zero indicator.

2. The progressive decoding method of claim 1 wherein when all of the scans are processed, a plurality of integral decoded pixels are generated from summing partial decoded pixels generated from the scans, and the integral decoded pixels form the image data.

3. The progressive decoding method of claim 1 wherein the bit-stream signal is a progressive JPEG bit-stream signal, and the image data is a JPEG image data.

4. The progressive decoding method of claim 1 further comprising:
   down-sampling the partial decoded pixel generated from each of the scans for generating a partial down-sampling decoded pixel; and
   summing up the partial down-sampled decoded pixel generated from each of the scans and according to the predetermined sequence, and updating a non-zero history with the non-zero indicator.

5. A progressive decoding method for decoding a bit-stream signal into an image data, the bit-stream signal comprising a plurality of scans, the image data being generated after all of the scans are processed with the progressive decoding method, the progressive decoding method comprising:
   (a) receiving a scan;
   (b) determining whether the scan is the first scan of the scans; if it is, progressing to step (c); if it is not, progressing to step (d);
   (c) decoding the scan into a partial decoded pixel and a non-zero history;
   (d) decoding the scan into a partial decoded pixel and a non-zero indicator, wherein the non-zero indicator represents whether or not an encoding coefficient of the current decoded scan corresponds to a non-zero value; progressing to step (e);
   (e) summing up the partial decoded pixel and a previously summed partial decoded pixel and updating the non-zero history with the non-zero indicator.

6. The progressive decoding method of claim 5 further comprising:
   (f) determining whether the scan is the last scan of the scans after steps (c) or
   (e), and if it is, stopping performing the progressive decoding method.

7. The progressive decoding method of claim 5 being performed by a progressive decoder having a memory device, wherein the progressive decoding method further comprises:
   (g) before step (e), retrieving the previously summed partial decoded pixel and the previously generated non-zero history from the memory device; and
   (h) after step (e), storing the newly summed partial decoded pixel and the newly updated non-zero history into the storage device.

8. The progressive decoding method of claim 7 wherein the decoder further comprises a processing unit electrically coupled to the storage device, and the processing unit is used for receiving the scans of the bit-stream signal, performing the progressive decoding method, and outputting the image data.

9. The progressive decoding method of claim 5 wherein when all of the scans are processed, a plurality of integral decoded pixels are generated from summing partial decoded pixels generated from the scans, and the integral decoded pixels form the image data.

10. The progressive decoding method of claim 5 wherein the bit-stream signal is a progressive JPEG bit-stream signal, and the image data is a JPEG image data.

11. A progressive decoding method for decoding a bit-stream signal into an image data, the bit-stream signal having a plurality of scans, the image data being generated after each of the scans is processed by the progressive decoding method, the progressive decoding method comprising:
   (a) receiving a scan;
   (b) determining whether the scan is the first scan of the scans; if it is, progressing to step (c); if it is not, progressing to step (e);
   (c) decoding the scan into a partial decoded pixel and a non-zero history;
   (d) after step (c), down-sampling the partial pixel for generating a partial down-sampled decoded pixel;
   (e) decoding the scan into a partial decoded pixel and a non-zero indicator, wherein the non-zero indicator represents whether or not an encoding coefficient of the current decoded scan corresponds to a non-zero value;

(f) after step (e), down-sampling the partial decoded pixel for generating a partial down-sampled decoded pixel; and (g) after step (f), summing up the partial decoded pixel and a previously summed partial down-sampled decoded pixel, and updating the non-zero history with the previously generated non-zero indicator.

12. The progressive decoding method of claim 11 further comprising:

(h) determining whether the scan is the last scan of the scans after steps (d) and (g), and if it is, stopping performing the progressive decoding method.

13. The progressive decoding method of claim 11 being performed by a progressive decoder having a storage device, wherein the progressive decoding method further comprises:

(i) before step (g), retrieving the previously summed partial down-sampled decoded pixel and the previously updated non-zero history from the storage device; and (j) after step (g), storing the newly summed partial down-sampled decoded pixel and the newly updated non-zero history into the storage device.

14. The progressive decoding method of claim 13 wherein the decoder further comprises a processing unit electrically coupled to the storage device, and the processing unit is used for receiving the scans of the bit-stream signal, for performing the progressive decoding method, and for outputting the image data.

15. The progressive decoding method of claim 13 wherein the decoder further comprises a filtering device for performing step (c) and step (f).

16. The progressive decoding method of claim 11 wherein when all of the scans are processed, a plurality of integral decoded pixels are generated from summing partial decoded pixels generated from the scans, and the integral decoded pixels form the image data.

17. The progressive decoding method of claim 11 wherein the bit-stream signal is a progressive JPEG bit-stream signal, and the image data is a JPEG image data.

18. A progressive decoder for decoding a bit-stream signal into an image data, the bit-stream signal having a plurality of scans, the progressive decoder comprising:

a processing unit for receiving the scans in a predetermined sequence, decoding each of the scans into a partial decoded pixel and a non-zero indicator according to the predetermined sequence, summing the partial decoded pixels generated from each of the scans according to the predetermined sequence, updating a non-zero history with the non-zero indicator each time a scan being decoded, and outputting the image data, wherein the non-zero indicator represents whether or not an encoding coefficient of the current decoded scan corresponds to a non-zero value;

a storage device for storing a summed partial decoded pixel and the non-zero history; and a memory management unit electrically coupled to the storage device and the processing unit for controlling the storage device.

19. The progressive decoder of claim 18 further comprising a filtering device in the processing unit for down-sampling the partial decoded pixel generated from each of the scans to generate a corresponding partial down-sampled decoded pixel.

20. The progressive decoder of claim 18 further comprising a display unit electrically coupled to the memory management unit for displaying the image data.

* * * * *